United States Patent [19]

Jones et al.

[11] 4,233,358

[45] Nov. 11, 1980

[54] METHOD FOR THE PRODUCTION OF WATERPROOF AND LIKE FABRICS

[75] Inventors: Norman Jones, Blackburn; Peter Dawson, Darwen, both of England

[73] Assignee: Clemead Limited, England

[21] Appl. No.: 13,169

[22] Filed: Feb. 21, 1979

[30] Foreign Application Priority Data

Oct. 13, 1978 [GB] United Kingdom ............... 40583/78

[51] Int. Cl.² .............................................. B32B 7/00
[52] U.S. Cl. .................................... 428/246; 156/230; 156/239; 156/243; 156/246; 156/247; 428/252; 428/253; 428/254; 428/265; 428/423.3
[58] Field of Search ............... 428/245, 246, 252, 253, 428/254, 260, 262, 265, 339, 423; 156/230, 239, 243, 246, 247

[56] References Cited

U.S. PATENT DOCUMENTS

| 3,649,344 | 3/1972 | Crabtree et al. | 428/253 |
| 3,650,880 | 3/1972 | Tieniber | 428/253 |
| 3,794,548 | 2/1974 | Wirth et al. | 428/253 |

*Primary Examiner*—James J. Bell
*Attorney, Agent, or Firm*—Harrington A. Lackey

[57] ABSTRACT

A method of producing a stretchable coated fabric having waterproof or like characteristics of particular application to the manufacture of protective clothing is proposed wherein plural layers of a coating material are applied to a carrier element having release characteristics relative to the material of the layers, and such layers are laminated to a stretchable textile fabric comprising continuous filament yarns by utilizing the tension in the carrier element to provide a laminating pressure.

14 Claims, 1 Drawing Figure

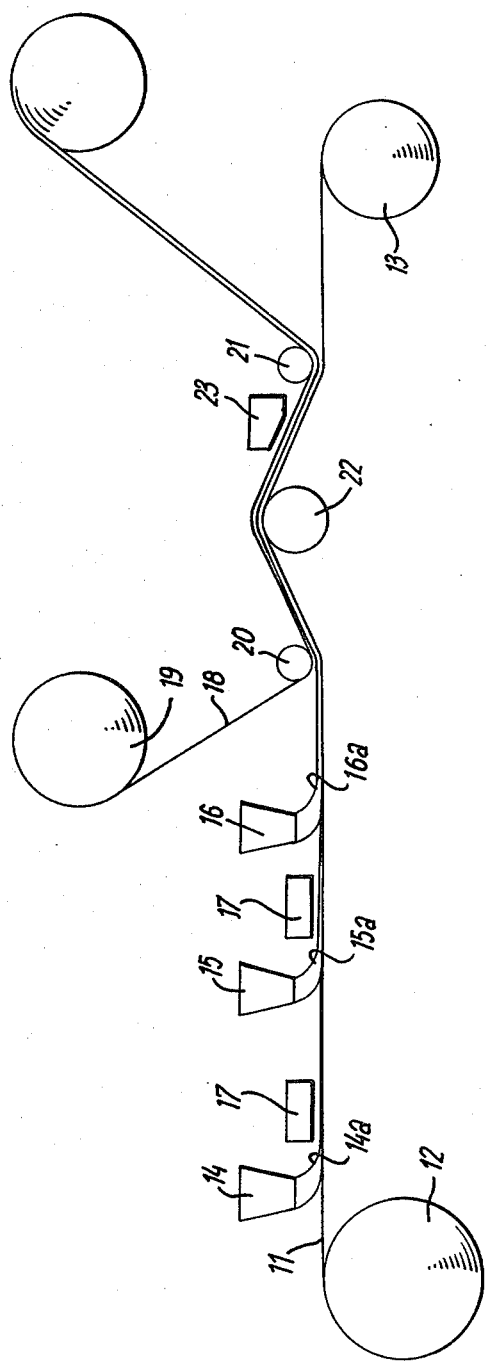

METHOD FOR THE PRODUCTION OF WATERPROOF AND LIKE FABRICS

The invention concerns a method for the production of coated textile fabrics, for example, waterproof and like fabrics, and has particular reference to stretchable coated fabrics.

Waterproof fabrics are known which comprise a base layer of a textile material and a layer or layers of plastics coating material laminated therewith, but such fabrics are often of doubtful effectiveness as waterproof fabrics after having been stretched, whether in use or otherwise, the presence of loops or hairs upstanding from the surface of the base material giving rise to a reduced coating thickness in register with such loops or hairs which is insufficient to maintain the integrity of the coating as a barrier to the passage of water. The problem becomes particularly acute when the fabric is stretched, since the coating tends to give discrete holes of pin-prick dimensions.

The object of the present invention is to provide a method of producing a coated fabric having stretch characteristics which will not exhibit the tendency to failure of its waterproofing or other proofing capability present in existing coated fabrics.

According to the present invention a method for the production of stretchable coated textile fabrics is proposed which comprises the steps of applying plural layers of coating material to an elongate, flexible carrier element having a release capability in relation to the coating material and transferring such plural layers to a textile fabric by transfer coating techniques, the said textile fabric being wholly of continuous filament synthetic yarns, the respective formulations of the successive layers and the application thereof to the immediately preceding layer existing on the carrier element being such that a given coating layer will fuse with the free surface and immediately adjacent parts of such preceding layer, and laminating the layers and textile fabric together by applied pressure derived from the tension of the carrier element.

According to a preferred feature, the coating layers as applied to the textile fabric are such as to impart a waterproof characteristic to the end product.

The invention also includes a coated textile fabric produced in accordance with the foregoing method.

The invention will now be described further, by way of example only, with reference to the accompanying diagrammatic drawing illustrating one embodiment thereof.

Referring to the drawing, in producing a stretchable coated fabric having a waterproof characteristic an elongate carrier layer or release paper 11 is delivered from a roll 12 and is rewound as a roll 13, and multiple layers of coating material are applied to the release paper at coating heads 14, 15, 16 arranged in spaced disposition longitudinally of the free run of such paper and adjacent the upper face thereof, there being a respective heater 17 for each coating head 14, 15 each positioned downstream thereof in the direction of paper movement, the said heaters serving to direct heated air towards the coating material thus to effect the drying or partial drying thereof.

Textile backing material 18, provided in the form of a roll 19, is brought into laminating contact with the outermost of the coating layers present on the release paper at guide roller 20, and such material 18, together with the coating layers 14a, 15a, 16a, is separated from the release paper at guide roller 21, a pressure roller 22 is positioned against the underside of the release paper 11 to displace the path of movement of a run of the release paper 11 from an otherwise normal plane of movement defined by the common tangent to the underside of guide rollers 20 and 22. The laminating pressure applied to the laminate of the runs of release paper 11, the coating layers 14a, 15a, 16a, and the textile backing material 18, is determined by the tension applied to the corresponding run of release paper 11.

A further heater 23 is provided above the laminate and subsequent to guide roller 22 in the direction of laminate movement.

The release paper will be of a kind conventionally used in the art, and its surface and release characteristics will be determined by the surface texture required in the finished product and by the nature of the coating material to be carried thereby, respectively.

The coating layers will each be of an aromatic polyurethane and approximately 0.025 millimeters thick the formulations of the individual layers varying according to the particular layer concerned. In a typical example, the first two layers applied to the release paper will each comprise 25% solids, 37½% DMF solvent and 37½% toluene diluent, whilst the third layer will comprise 25% solids, from 25 to 27% DMF solvent and the balance toluene diluent, the overall coating weight being 90 grams per square meter.

The textile fabric to which the plural layers are applied preferably comprises a weft knit fabric of continuous filament polyester yarns, such fabric having stretch characteristics adequate to fit the ultimate fabric for use in the context of, for example, weatherproof and protective clothing. However, other fabric constructions and other yarns may be preferred in some instances, the primary requirements of the fabric construction and/or the yarns utilised being those of a stretch characteristic in the case of the fabric and an absence of fibre ends or protruding loops in the case of the yarn.

If desired, the first and/or second coating layers as applied to the release paper may be pigmented.

We have found that by utilising continuous filament yarns in the fabric, by laminating without the use of a roller nip, and by so arranging that a coating layer as applied to a layer already existing on the release paper will do no more than simply fuse with the free surface and immediately adjacent parts of such layer, we are able to provide a coated fabric which maintains its waterproof characteristic even on excessive stretching, and thus is superior to coated fabrics made by conventional methods.

The invention is not restricted to the exact features of the embodiment disclosed, since alternatives will readily present themselves to one skilled in the art.

Thus, it is appreciated that alternative formulations to those specifically referred to may be utilised, subject to their satisfying the requirement that, on application of the final coating layer the solvents present in such layer do not soften the layer first applied to the release paper (or equivalent) beyond the original surface regions thereof. Indeed, the invention is not limited to the use of aromatic polyurethane, since alternative coating materials, for example, aliphatic urethanes, may be preferred in some instances.

Whilst it is preferred to provide three discrete layers of coating material it may be found sufficient to utilise only two such layers, and the disclosure hereof is to be construed accordingly.

What is claimed is:

1. A method for the production of waterproof stretchable coated textile fabrics comprising the steps of:
   (a) applying plural layers of coating material to an elongate, flexible carrier element having a release capability in relation to the coating material, the respective formulations of the successive layers and the application thereof to the immediately preceding layer existing on the carrier element being such that a given coating layer will fuse with the free surface and immediately adjacent parts of such preceding layer;
   (b) contacting a surface of a length of a textile fabric formed wholly of continuous filament synthetic yarns with said layers of coating material on said carrier element, and
   (c) tensioning a run of said carrier element carrying said layers and a textile fabric run so that said textile fabric run is also tensioned, the tensioning of said carrier element run creating laminating pressure between said textile fabric run and said carrier element run so that said layers are transferred to the textile fabric and said layers and textile fabric are laminated together to form a laminate.

2. The method as claimed in claim 1, wherein three discrete coating layers are combined together and are applied to the textile fabric.

3. The method as claimed in claim 1, wherein at least the first of the coating layers applied to the carrier element is pigmented, thereby to provide a requisite colour characteristic in the finished laminate.

4. The method as claimed in claim 1, wherein said step of tensioning said carrier element run comprises displacing the path of the carrier element run in the direction towards said layers, between longitudinally spaced guide means supporting said runs for longitudinal movement.

5. The method as claimed in claim 1, including the step of partially curing each coating layer prior to the application thereto of a subsequent coating layer.

6. The method as claimed in claim 5, wherein heat is applied to each coating layer prior to the application thereto of a subsequent coating layer.

7. The method as claimed in claim 1, including the step of heating the laminate subsequent to the application of laminating pressure thereto.

8. The method as claimed in claim 7, including the step of partially curing each coating layer prior to the application thereto of a subsequent coating layer.

9. A waterproof stretchable coated textile fabric produced by the method comprising the steps of:
   (a) applying plural layers of coating material to an elongate, flexible carrier element having a release capability in relation to the coating material, the respective formulations of the successive layers and the application thereof to the immediately preceding layer existing on the carrier element being such that a given coating layer will fuse with the free surface and immediately adjacent parts of such preceding layer;
   (b) contacting a surface of a length of a textile fabric formed wholly of continuous filament synthetic yarns with said layers of coating material on said carrier element, and
   (c) tensioning a run of said carrier element carrying said layers and a textile fabric run so that said textile fabric run is also tensioned, the tensioning of said carrier element run creating laminating pressure between said textile fabric run and carrier element run so that said layers are transferred to the textile fabric and said layers and textile fabric are laminated together to form a laminate.

10. A stretchable coated textile fabric as claimed in claim 9, wherein the textile fabric is of weft knitted construction.

11. A stretchable coated textile fabric as claimed in claim 9, wherein the coating comprises plural layers of an aromatic polyurethane.

12. A stretchable coated textile fabric as claimed in claim 9, wherein the textile fabric comprises a weft knitted structure consisting wholly of continuous filament polyester yarns.

13. A stretchable coated textile fabric as claimed in claim 12, wherein the coating comprises plural layers of an aromatic polyurethane.

14. A stretchable coated textile fabric as claimed in claim 12, wherein the coating comprises plural layers of an aliphatic urethane.

* * * * *